(No Model.)

J. M. ALLEN & J. PARKER.
DRIVING MECHANISM FOR BICYCLES, &c.

No. 517,373. Patented Mar. 27, 1894.

Witnesses:
A. V. Groupe
B. Schlucher

Inventors:
Justus M. Allen &
John Parker
by their Attorneys
Howson & Howson

UNITED STATES PATENT OFFICE.

JUSTUS M. ALLEN AND JOHN PARKER, OF PHILADELPHIA, PENNSYLVANIA.

DRIVING MECHANISM FOR BICYCLES, &c.

SPECIFICATION forming part of Letters Patent No. 517,373, dated March 27, 1894.

Application filed February 21, 1893. Serial No. 463,280. (No model.)

*To all whom it may concern:*

Be it known that we, JUSTUS M. ALLEN, a citizen of the United States, and JOHN PARKER, a subject of the Queen of Great Britain, residing at Philadelphia, Pennsylvania, have invented certain Improvements in Driving Mechanism for Bicycles, &c., of which the following is a specification.

Our invention consists of a differential driving gear for bicycles and like vehicles in which the power is that of the hand or foot, exerted through the medium of a crank, one object of our invention being to so construct such differential gearing that the varying power applied to the crank at different points in its stroke, will, in a measure, be equalized in transmission to the driving wheel, so that the power applied to the latter will be more nearly uniform, high speed being attained because of this continuous application of substantially uniform power, to said driving wheel.

A further object is to construct and arrange the transmitting gearing so as to render the same extremely compact and prevent it from getting in the way of the rider either in mounting or running the machine, and a still further object is to provide for the ready removal of the driving wheel when necessary.

Figure 1:
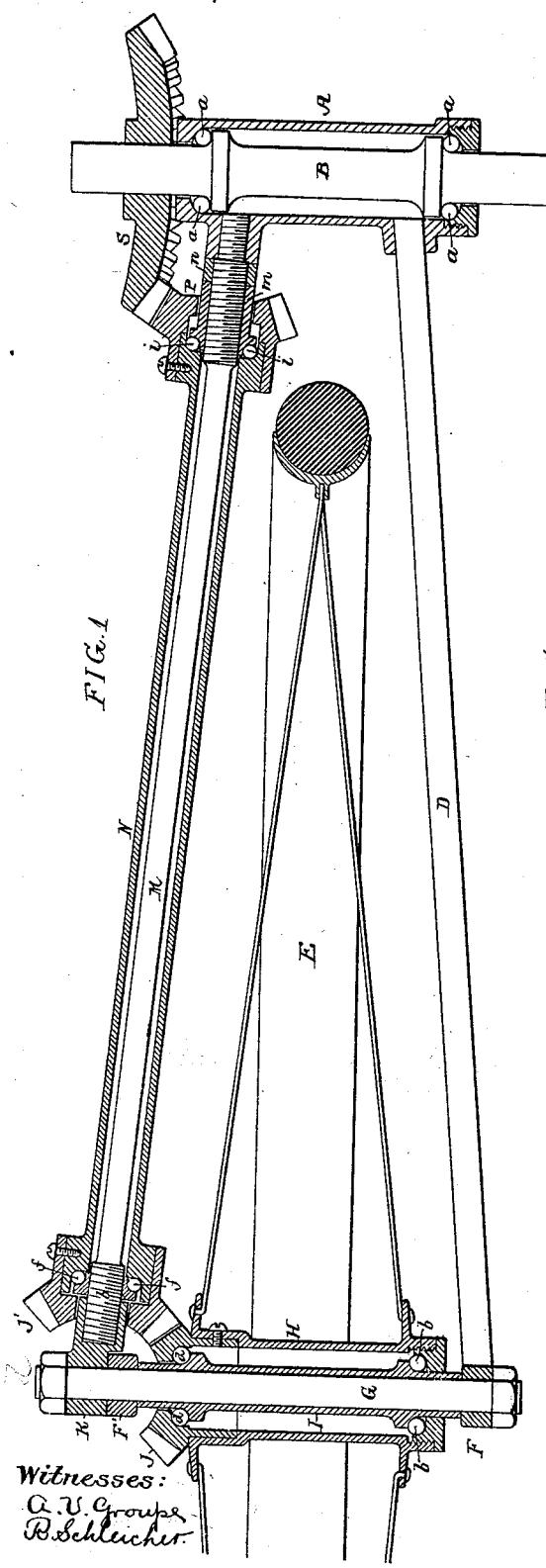
Figure 2:
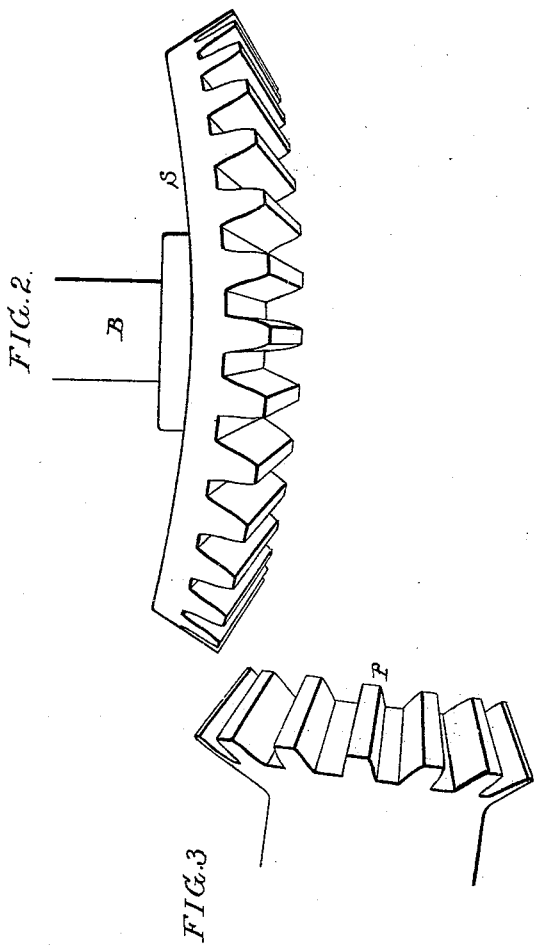
Figure 3:
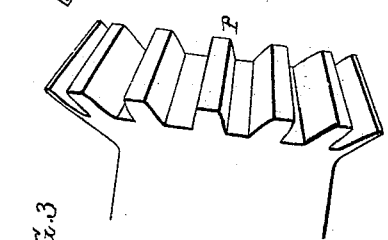

In the accompanying drawings:—Figure 1, is a sectional plan view of sufficient of a bicycle to illustrate our invention; and Figs. 2 and 3, are side views of the two elements of the gearing to which our invention is particularly directed.

A represents the tubular crank shaft hanger which forms part of the fixed frame of a bicycle, this hanger having, at each end, a ball bearing $a$ for the said crank shaft B, and being connected, at one side of the rear wheel E, by means of a rod or bar D, with one of the forks F of the rear frame which carries the axle G for said rear wheel.

The hub of the wheel E is represented at H, this hub having, at one end, a ball bearing $b$ upon a sleeve I which surrounds the axle G and practically forms the bearing surface of said axle, being clamped between the forks F F' of the rear frame, to which the axle G is also secured by end nuts $d$. The hub of the wheel E has a bevel wheel J which is mounted upon balls $b'$ running upon the sleeve I. The axle G projects some distance beyond the fork F' of the rear frame and to this projecting portion of the axle is secured, by means of the end nut $d$, a bracket K which receives the rear end of a rod M, the forward end of which is secured to a boss upon the rear portion of the crank shaft hanger A. Surrounding the rod M is a tubular shaft N which has, at the rear end, a bevel wheel J' meshing with the wheel J upon the hub of the driving wheel, and the rear end of said shaft N has a ball bearing $f$ upon an adjustable sleeve or collar $g$ on the rod M, the front end of the shaft having a similar ball bearing $i$ upon an adjustable sleeve or collar $m$ on said rod, a locking sleeve or nut $n$ being, by preference, interposed between said sleeve $m$ and the boss upon the hanger A. The front end of the shaft M carries an eccentric bevel pinion P which meshes with a bevel wheel S on the crank shaft B, the face of said bevel wheel S being curved or crowned to accord with the eccentricity of the pinion P, as shown in Figs. 1 and 3. The pinion P and wheel S are so disposed in respect to the cranks of the shaft B that when said cranks are at or approaching mid-stroke the wheel S will be acting upon that portion of the pinion P which is of least radius, and when the cranks are at or approaching the dead center point the wheel S will be acting upon that portion of the pinion P which is of greatest radius.

In any crank motion, the most power is exerted at or near mid-stroke when the thrust is most direct, the power gradually increasing from the dead center to or about mid-stroke and then gradually decreasing from mid-stroke to the next dead center, so that power transmitted directly from a crank is always variable, and although in some double crank powers this variation is, to a certain extent, corrected by setting the cranks at an angle of ninety degrees in respect to each other, such setting of the cranks is not possible in bicycles, where the cranks are always set at one hundred and eighty degrees in respect to each other so that both cranks are passing their centers and mid points at the same time. By our improved gearing, however, the variation in the power applied by the crank is, in a great measure, compensated for by the varying leverage of the member P of the transmitting gearing, for instance, when the cranks are at or about mid-stroke and are consequently in the best position for transmitting the power applied to them, the bevel wheel S is acting upon the pinion P at the point closest to the axis of the latter where the leverage is most against said wheel S, while as the crank travels from the mid-point toward the dead center the point of application of power to the pinion P is gradually getting farther and farther from the axis of the same so as to compensate for the decreasing power of the crank, and, in the same way, as the crank travels from the center toward the mid-point and the power exerted by the same is gradually increased the point of application of power to the pinion P again gradually approaches the axis of the same, hence the application of power to the driving wheel E is rendered substantially uniform.

The mounting of the shaft N upon the brace rod M not only provides for the convenient disposal of the shaft without detracting from the appearance of the machine, but it serves to strengthen said brace and stiffen the rear structure, and it also simplifies and cheapens the construction by providing for the placing of the bearings for the shaft N directly upon the brace rod.

It will be evident that it is immaterial whether the differential gears are at the front or rear end of the shaft N, or in other words, whether they serve to transmit the movement of the crank shaft to the shaft N or the movement of the latter to the hub of the rear wheel.

The rear wheel can be readily removed upon withdrawing the axle G, the sleeve I remaining in the hub of the wheel, and preventing disarrangement of the bearings $b\ b'$.

All of the bearings are, it will be observed, almost entirely inclosed, so as to be protected from dust and dirt, and the gear wheels may also be protected by means of a light inclosing casing.

Having thus described our invention, we claim and desire to secure by Letters Patent—

1. In driving gearing for bicycles and the like, the combination of the crank shaft and the driving wheel, with a transmitting shaft geared at one end to the crank shaft, and at the other end to the driving wheel, the gearing at one end of the shaft comprising an eccentric bevel pinion and a bevel wheel meshing therewith, and curved or crowned on the face to correspond with the eccentricity of the pinion, substantially as specified.

2. The combination in driving gear for bicycles and the like, of the crank shaft and its hanger, a driving wheel, a forked frame for the axle of said driving wheel, an axle passing loosely through the bearings in the wheel, a brace rod secured to the crank shaft hanger, a bracket sleeved on the axle and secured to the rear end of said brace rod, a transmitting shaft surrounding the brace rod and having its bearings thereon, and bevel gearing connecting said transmitting shaft to the driving wheel and crank shaft, substantially as specified.

3. The combination of the driving wheel, the forked rear frame, the axle secured to said forked frame, but removable laterally therefrom, and the sleeve surrounding the axle and carrying the ball bearings for the rear wheel, whereby on the withdrawal of the axle, the wheel, with the sleeve and bearings, can be removed without disarranging said bearings, substantially as specified.

4. The combination in driving gear for bicycles and the like, of the crank shaft and its hanger, a driving wheel, a forked frame for the axle of said driving wheel, an axle passing through the bearings of said wheel a brace rod secured to the crank shaft hanger, a detachable bracket secured to the rear end of said brace rod, a transmitting shaft surrounding the brace rod, bevel gearing connecting said transmitting shaft to the driving wheel and crank shaft, and sleeves carried by the brace rod and forming bearings for the balls upon which said tubular power transmitting shaft is mounted, substantially as specified.

In testimony whereof we have signed our names to this specification in the presence of two subscribing witnesses.

JUSTUS M. ALLEN.
JOHN PARKER.

Witnesses:
JNO. E. PARKER,
JOSEPH H. KLEIN.